June 7, 1932.  D. F. WILHELMI  1,861,673
PROCESS FOR MOLDING AN INDIA RUBBER GAS MASK
Filed June 23, 1927
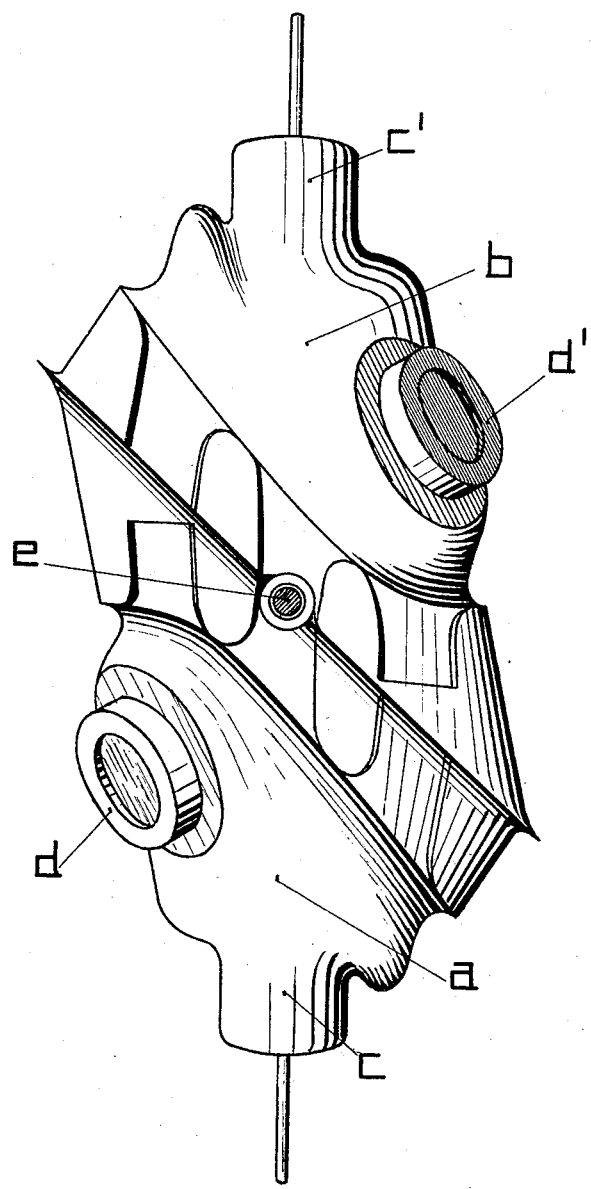
D. F. Wilhelmi
INVENTOR
By: Marks & Clerk
Attys.

Patented June 7, 1932 1,861,673

UNITED STATES PATENT OFFICE

DIRK FRANS WILHELMI, OF HEVEADORP, THE NETHERLANDS, ASSIGNOR TO NAAM-
LOOZE VENNOOTSCHAP VEREENIGDE NEDERLANDSCHE RUBBERFABRIEKEN, OF
HEVEADORP, THE NETHERLANDS, A COMPANY OF THE NETHERLANDS

PROCESS FOR MOLDING AN INDIA RUBBER GAS MASK

Application filed June 23, 1927, Serial No. 200,955, and in France August 11, 1926.

The present invention relates to a process for the molding, the keeping to shape and the lifting from mold, in view of vulcanization, of an india-rubber mask protecting the bearer against asphyxiant gas, as well as to a special core for this process.

Methods are already known for attending to vulcanization of india-rubber hollow articles of a great many different outlines, in molds subdivided into several portions, in such a manner that, after the operator has applied the india-rubber upon a core, he can have it so surrounded by the exterior mold as to secure a compact unit; he can take off the exterior mold and remove the core after vulcanization has been effected, in order to remove the vulcanized article.

Whenever carrying this method into practice for the treatment of articles having thin walls of india-rubber wherein fabric insertions should be vulcanized, a drawback is experienced in that, owing to the unavoidable difference in width, at certain points, between the article of india-rubber to be manufactured and the gap left free between the core and the external mold, the raw material is subject to transverse distortion and warping, and this is liable to cause creasing or even tearing of the inserted fabric, with the result of rendering the vulcanized article unfit for service.

Besides, the more complicated the outline of the piece being dealt with, the more parts there must be in the mold to allow of assembly or dismantling of molds.

Now, increasing the number of constituent parts of the mold brings about a number of inconveniences, say, for example, a more complicated operation, accessory parts also complicated, less resistance of the mold to the pressure which can never be dispensed with in vulcanization, more risk of breakage of the mold parts, and the production of an article which, when vulcanized, must be freed from the burr formed on it, an operation taking much time.

All of these drawbacks are especially inherent to the manufacture of india-rubber masks for protection against asphyxiant gas, because these articles are neither large nor thick inasmuch as their surface has corrugations and protruding portions such as those corresponding to the eyes and the mouth borders, the theoretical axis of which are not parallel to each other, on account of which it would not be possible to ever work with rigid and one-piece molds (internal and external) since such molds could not be separated when necessary.

In the accompanying drawing is illustrated in a perspective view, a suitable core according to the present invention.

The novel method forming the subject-matter of the present invention does away with these drawbacks, and allows operators to work with the aid of one single internal core and only one external mold, owing to its special features, in that the mask is shaped upon an expandible core the external surface of which corresponds to the internal surface of the mask, the whole to be then placed into a rigid external mold the internal surface of which follows the external surface of the mask, whereafter, through causing a pressure (gas or liquid) to act inside the expandible core, this latter will expand in all directions thus heavily pressing against the material of the mask, which is thus squeezed between the expanded core and the rigid external mold; whilst undergoing this pressure, the material, by applying the necessary temperature, will be vulcanized; whereupon the operator will relieve the pressure, and this, resulting in shrinkage of the core down to its initial size, will allow the operator to remove the core and the mask from the external mold.

The external mold as also the core, are thus each one single piece. As to their respective material, the external mold can be, for instance, made of iron, and the core of india-rubber.

The radially directed expansion of the core only results in a compression of the raw material, whereby any sideward shift of the mass and any creasing of the fabric insertion are both rendered impossible.

When (as is the case if preparing a gas mask) a considerable portion of the article must remain open—say, that portion of the mask through which the head must be introduced—it is preferable to prepare a double core having the particular feature of being constituted of two hollow and expansible cores, so joined to each other that their juncture corresponds to the open ends of the masks: whereby the whole surface of the core is utilized in the manufacture.

When—as is once more the case for gas masks—that portion of a core which corresponds to an open part of a mask is not perpendicular to its longitudinal axis (difference in height between the border of the neck and that of the forehead) this double core can be prepared in a less expensive way by having the two halves not only so placed against each other as to contact at the their sides which correspond to the open parts, but, besides, set back at a 180° angle to each other in such a manner that the surface upon which the two core halves are united will be inclined with respect to the longitudinal axis of the double core.

The accompanying drawing will show in a more comprehensive way the principle of the invention. In this figure, a designates in perspective view a double core over which a mask is to be molded, while b is the portion placed upside down, and, besides, set-back at a 180° angle to the first mentioned, and intended for shaping a second mask; c and c' are the openings left in the masks for the bearer's mouth, d and d' being the rings to correspond to their eyes (left side); e is the orifice for connection of the pipe through which the gas or liquid under pressure flows into the core.

I claim:

A process for molding and vulcanizing gas masks and the like articles having protruding parts with non-parallel axes, characterized by the following steps, first, forming the material to be vulcanized over a flexible core, the outer form of which corresponds with the inner profile of the article slightly diminished; second, placing the combined core and material into a stiff outer mold, the inner profile of which corresponds with the outer profile of the article; third, applying pressure to the inside, thereby causing the flexible core to be dilated, so that the core with its material is pressed with all the non-parallel and non-coaxial protruding parts into the corresponding recesses of the outer mold; fourth, vulcanizing the material while distended in the mold by using the necessary temperature; fifth, diminishing the pressure, thereby causing the core to draw back out of the outer mold permitting its removal, and finally removing the now vulcanized article from the outer mold.

In testimony whereof I have signed my name to this specification.

DIRK FRANS WILHELMI.